(No Model.)
R. BROWNSON.
HORSE COLLAR.
No. 397,066. Patented Jan. 29, 1889.
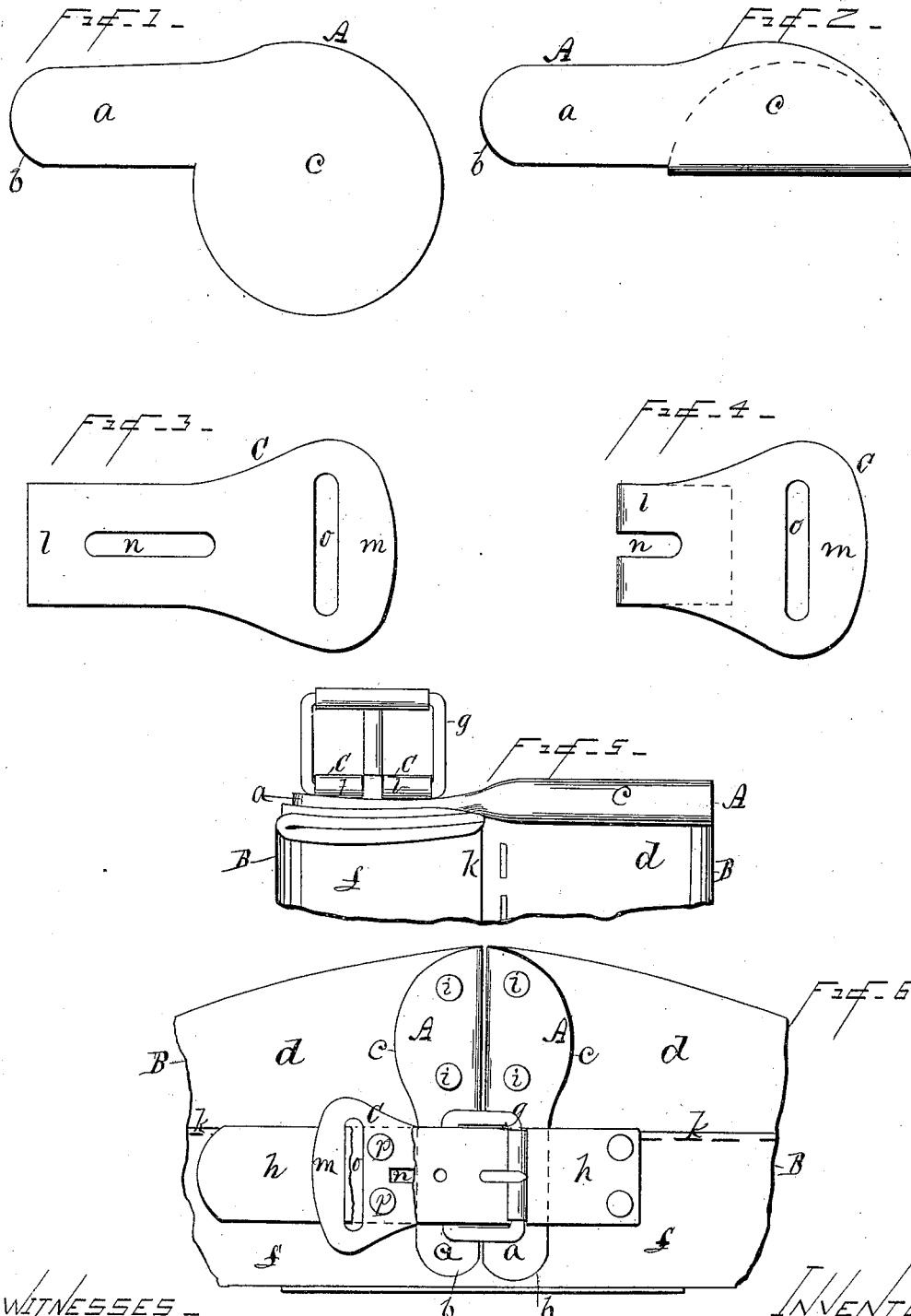

UNITED STATES PATENT OFFICE.

RALPH BROWNSON, OF ST. PAUL, MINNESOTA, ASSIGNOR OF ONE-HALF TO PETER R. L. HARDENBERGH, OF SAME PLACE.

HORSE-COLLAR.

SPECIFICATION forming part of Letters Patent No. 397,066, dated January 29, 1889.

Application filed June 5, 1888. Serial No. 276,077. (No model.)

*To all whom it may concern:*

Be it known that I, RALPH BROWNSON, a citizen of the United States, residing at St. Paul, in the county of Ramsey and State of Minnesota, have invented an Improved Horse-Collar; and I do hereby declare that the following is a full and exact description of the same, reference being had to the accompanying drawings, making part of this specification.

Figure 1 of the drawings represents a view of one of the pieces which form a binding for the ends of a horse-collar; Fig. 2, a view of the same doubled over as when it is applied to the end of a horse-collar to bind the same; Fig. 3, a view of the buckle-piece, showing its form before applying to a horse-collar; Fig. 4, a view of the same doubled over as when it is applied to a horse-collar; Fig. 5, an inner end view of one end of a one-buckle horse-collar, showing one binding-piece and the buckle-piece applied thereto; Fig. 6, a view of the two ends of a one-buckle horse-collar buckled together and showing my improvements applied thereto.

Like letters designate corresponding parts in all of the figures.

The binding-pieces A A for the ends of the stuffed collar B are made substantially as follows: Each binding-piece A is of the form substantially as shown in Fig. 1. This part has one end, $a$, of proper length to substantially cover the outer surface of one end of the body part of the collar, and preferably rounded at the end $b$, as shown, and the other end, $c$, is laterally extended somewhat more than twice the width of the part $a$, substantially as shown. This part preferably has also a rounded end, substantially as represented; but I do not restrict myself to any particular form of the parts of the piece. In applying this binding-piece to the end of the collar it is to be noted that a one-buckle horse-collar, to which this invention is most suitably attached, has its rim $d$ higher than the body $f$, and forms a peak, as shown in Fig. 5, and the buckle $g$ is attached to the end of the body on one side, and the billet $h$ for the buckle is attached to the body on the other side. With such form of collar a simple binding-piece of uniform width cannot be applied to the end of the collar and make good work or a smooth and finished appearance; but with my binding-piece of the form shown in Figs. 1 and 2 the widened part $c$ is doubled around the edge of the rim of the collar, while the narrow part $a$ is simply laid upon the outer or upper surface of the body of the collar, as shown in Figs. 5 and 6. The binding-piece, when applied to the end of the collar, is secured thereto by rivets $i$ $i$ $i$, passed through the piece and the collar and headed. The rivets passing through the rim of the collar also pass through both folds of the binding-piece. The doubled part $c$ thus forms a rigid and well-shaped peak at the end of the rim, and the part $a$, extended in one piece, forms a protection for the middle seam, $k$, of the collar, and a firm covering for the body part of the collar, where the buckle and billet are attached. The binding-pieces are made of leather sufficiently thick and firm for the purpose. Ordinarily I make them of small pieces of harness-leather, left in cutting out the main pieces for harness work and therefore of little value for other uses.

A buckle-piece, C, is made of the form substantially as shown in Figs. 3 and 4, and applied in the manner and for the purpose as follows, referring also to Figs. 5 and 6.

The buckle-piece C is cut out of leather into the form substantially as shown in Fig. 3, one end, $l$, being of the proper width to fit within the sides of the buckle $g$, Figs. 5 and 6, and the other end, $m$, is widened substantially as shown, and preferably rounded. In the narrow end $l$ is cut a longitudinal slot, $n$, to receive the tongue of the buckle, and in the widened end $m$ is cut a transverse slot, $o$, to receive the billet after the same is passed through the buckle. This piece is then doubled over on a line midway of the length of the buckle-tongue slot $n$ and transverse to the same, as shown in Fig. 4. It is then secured upon the body of the collar, near one end thereof, after passing the doubled end around the buckle-bar by rivets $p$ $p$, passed through both thicknesses of the doubled piece and through the collar and headed, all as shown in Fig. 6, in which it is seen how the slot o in the piece is in position to receive the billet after it is passed through the buckle. This buckle-piece serves the double purpose of a buckle-loop and of a separate billet-loop. These pieces are also made of small pieces or scraps of harness-leather, and cost but a very little.

I claim as my invention—

A horse-collar constructed with binding-pieces A A, each having a narrow end, a, adapted to lie upon the body of the collar, and a widened end, c, adapted to be doubled around the end of the collar-rim, and with a buckle-piece, C, having a narrow end, l, adapted to fit in and be doubled around the bar of the buckle, and having a longitudinal buckle-tongue slot, and a widened end, m, having a transverse slot, o, to receive the billet after the same is passed through the buckle, substantially as and for the purpose herein set forth.

In testimony whereof I have hereunto set my hand in presence of two subscribing witnesses.

RALPH BROWNSON.

Witnesses:
W. ADAMS HARDENBERGH,
LOUIS FEESER, Jr.